(No Model.)
G. & C. W. BURKET.
TEAKETTLE.
No. 574,783.  Patented Jan. 5, 1897.
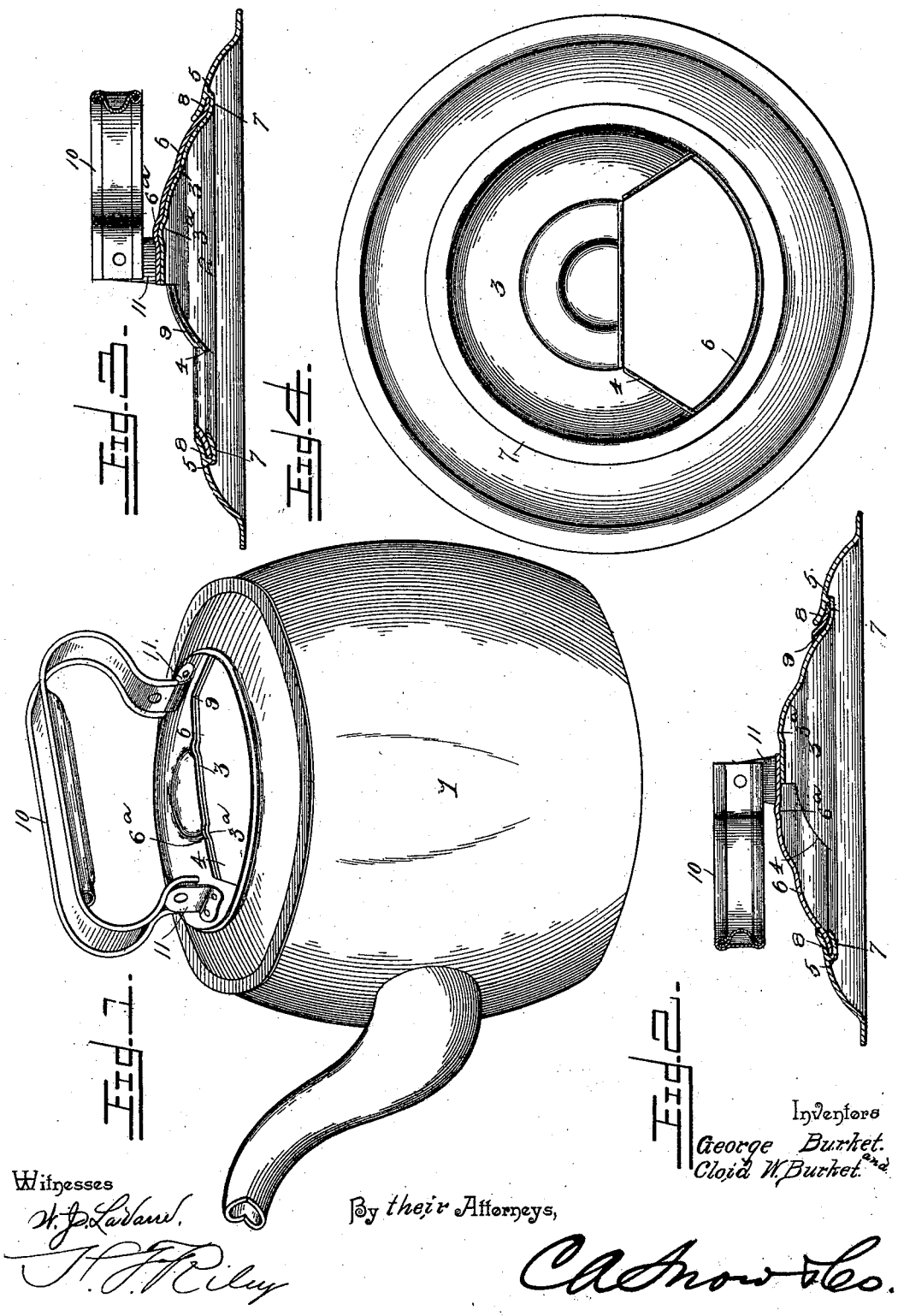
Witnesses
Inventors
George Burket
Cloid W. Burket
By their Attorneys,

UNITED STATES PATENT OFFICE.

GEORGE BURKET AND CLOID W. BURKET, OF MISSOURI VALLEY, IOWA, ASSIGNORS OF ONE-THIRD TO WILLIAM H. FENSLER, OF SAME PLACE.

TEAKETTLE.

SPECIFICATION forming part of Letters Patent No. 574,783, dated January 5, 1897.

Application filed June 23, 1896. Serial No. 596,610. (No model.)

*To all whom it may concern:*

Be it known that we, GEORGE BURKET and CLOID W. BURKET, citizens of the United States, residing at Missouri Valley, in the county of Harrison and State of Iowa, have invented a new and useful Teakettle, of which the following is a specification.

The invention relates to improvements in teakettles.

Heretofore teakettles have been constructed with rotary lids centrally pivoted and provided with hinged handles serving for carrying kettles and for manipulating the lids to open and close the kettles.

The object of the present invention is to improve such constructions, to increase the strength and durability of the lid, and to dispense with the pivot.

The invention consists in the construction and novel combination and arrangement of parts hereinafter fully described, illustrated in the accompanying drawings, and pointed out in the claim hereto appended.

In the drawings, Figure 1 is a perspective view of a teakettle provided with a lid constructed in accordance with this invention. Fig. 2 is a vertical sectional view of the top of the kettle, the lid being closed. Fig. 3 is a similar view, the lid being closed. Fig. 4 is a reverse plan view of the top of the kettle, the lid being open.

Like numerals of reference designate corresponding parts in all the figures of the drawings.

1 designates a teakettle constructed of any suitable material and of any desired shape having the usual spout and provided at its top with a circular opening 2. A stationary circular concavo-convex plate 3, which is provided at one side with an opening 4, is secured at its periphery to the lower face of the top of the kettle adjacent to the edge of the opening 2, and the outer edge 5 of the stationary concavo-convex plate 3 is upturned to offset the adjacent portion of the plate from the top of the kettle to provide a circular groove or way for the reception of a rotary lid 6. Adjacent to the upturned edge 5 of the stationary concavo-convex plate the latter is bent substantially horizontally to form a circular flange 7, which constitutes the bottom of the circular groove or way 8.

The rotary lid 6, which is concavo-convex, is arranged on the upper face of the stationary plate 3, and it is provided at one side with an opening 9, adapted to be made to register with the opening 4 of the plate 3 by rotating the lid when it is desired to open the top of the kettle, and the lid is rotated in the opposite direction to carry the opening 9 away from the opening 4 of the plate 3 to close the kettle. The lid 6, which carries a handle 10, has a complete circular edge or periphery which fits in the circular groove or way 8 of the top of the kettle, and it rotates freely. By having the stationary plate 3 and the rotary lid or cover 6 concavo-convex a central pivot is dispensed with and the lid cannot be sprung or bowed outward to disengage its peripheral edge or flange from the circular groove or way, as would be the case were a central pivot dispensed with in a rotary lid constructed of a perfectly flat plate or disk.

The stationary plate 3 and the cover or lid 6 are provided with similar concentric grooves or corrugations $3^a$ and $6^a$, which operate to center the cover on the stationary plate and enable the said cover to rotate freely without binding on its edges.

The handle 10, which is constructed of any suitable material, is pivoted at its ends to ears 11, which are secured to the upper face of the rotary lid at opposite sides thereof.

It will be seen that the top of the teakettle is strong and durable, that the rotary lid cannot be sprung outward to disengage its peripheral edge or flange from the circular groove or way of the top, and that a central pivot is dispensed with.

What we claim is—

The combination of a kettle-top provided with a circular opening, a stationary concavo-convex plate provided at one side with an opening and having an upturned edge secured to the lower face of the top of the kettle and forming a circular groove or way, and a rotary concavo-convex lid arranged on the upper face of the stationary plate at one side with an opening and having its periphery arranged in the said groove or way, said lid and plate being provided with corresponding concentric grooves or corrugations centering the lid of the plate and enabling the former to rotate freely without binding at its edges and without employing a central pivot, substantially as described.

In testimony that we claim the foregoing as our own we have hereto affixed our signatures in the presence of two witnesses.

GEORGE BURKET.
    CLOID W. BURKET.

Witnesses:
 WM. H. FENSLER,
 J. L. TAMISIEA.